July 8, 1924.

E. J. GUAY 1,501,028

NONMETALLIC GEAR AND METHOD OF FORMING THE SAME

Filed Nov. 19, 1923  2 Sheets-Sheet 1

Inventor:
Emile J. Guay
by *Alexander S. [signature]*
His Attorney

July 8, 1924.  
E. J. GUAY  
1,501,028  
NONMETALLIC GEAR AND METHOD OF FORMING THE SAME  
Filed Nov. 19, 1923  
2 Sheets-Sheet 2

Inventor:
Emile J. Guay,
by Alexander S. _____
His Attorney

Patented July 8, 1924.

1,501,028

UNITED STATES PATENT OFFICE.

EMILE J. GUAY, OF SWAMPSCOTT, MASSACHUSETTS, ASSIGNOR TO GENERAL ELECTRIC COMPANY, A CORPORATION OF NEW YORK.

NONMETALLIC GEAR AND METHOD OF FORMING THE SAME.

Application filed November 19, 1923. Serial No. 675,655.

*To all whom it may concern:*

Be it known that I, EMILE J. GUAY, a citizen of the United States, residing at Swampscott, in the county of Essex, State of Massachusetts, have invented certain new and useful Improvements in Nonmetallic Gears and Methods of Forming the Same, of which the following is a specification.

The present invention relates to gears which are made of woven spinnable textile fibers such as canvas or duck and a binder, such as a phenolic condensation product, for example.

For certain mechanical reasons, it is desirable that these gears should have relatively thick rims and hubs and relatively thin webs. I have heretofore disclosed ways of making these gears from rings or washers and disks, said rings or washers being utilized to form the thickened parts and the disks to tie said parts together to form a unitary structure.

The present invention is more specifically directed to the construction of the hub and rim parts or members of gears of the above-mentioned type of gear to the end that the woven material which is relatively expensive may be more economically utilized.

For a consideration of what I believe to be novel and my invention, attention is directed to the accompanying description and the claims appended thereto.

Figure 1:
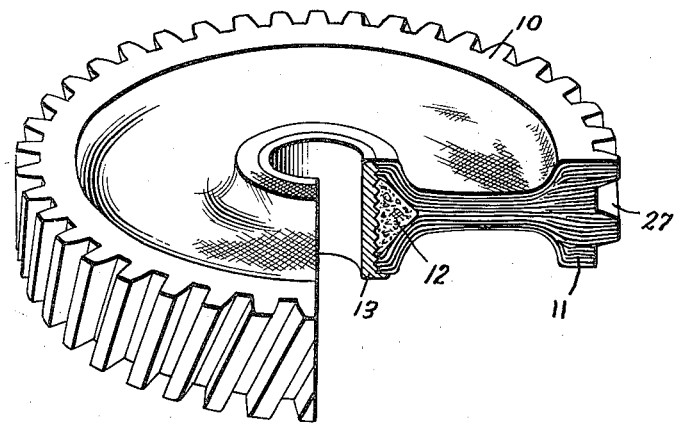
Figure 2:
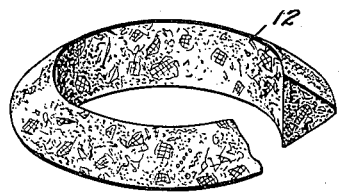
Figure 3:
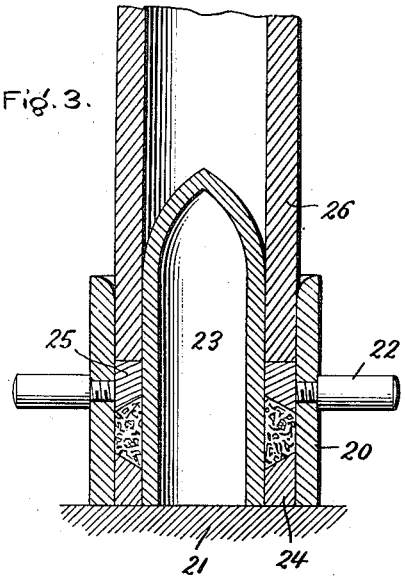
Figure 4:
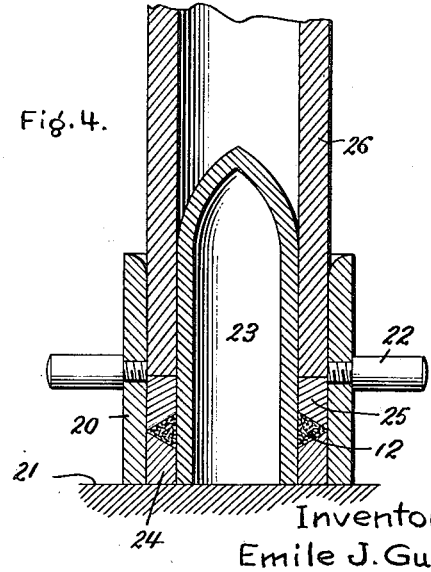
Figure 5:
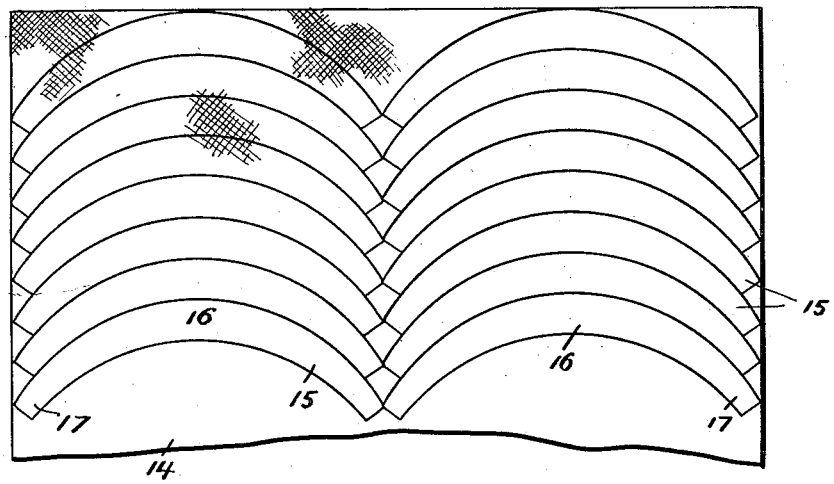
Figure 6:
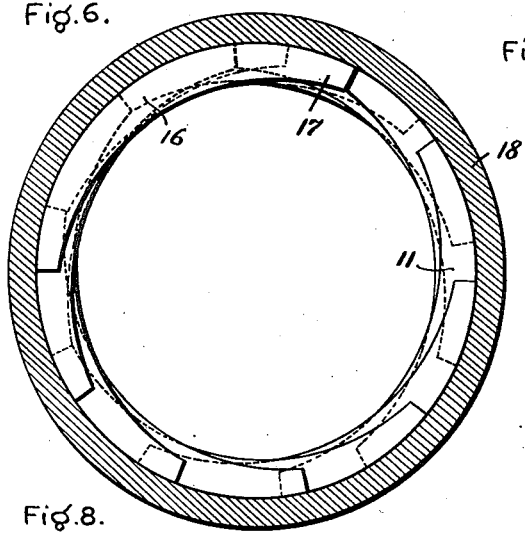
Figure 7:
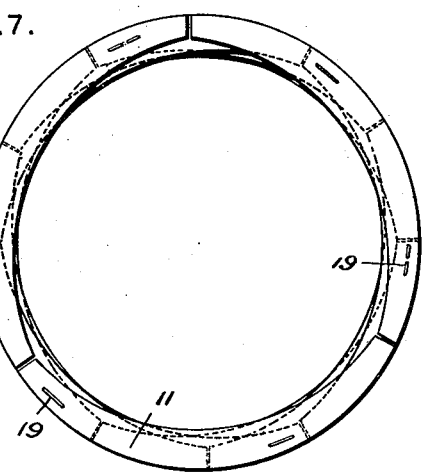

In the drawing which is illustrative of my invention Fig. 1 is a perspective view of a gear with a portion thereof cut away; Fig. 2 is a perspective view of a beveled washer for the hub; Figs. 3 and 4 are vertical sectional views of a mold or press for forming said hub washer; Fig. 5 illustrates the preferred method of forming the rings for the rim; Figs. 6 and 7 are views of rings for the rim, and Fig. 8 is a view of one of the disks.

In brief, the gear or blank shown in Fig. 1 comprises disks of woven material 19, interspersed rings 11 forming a part of the rim, a beveled washer 12 forming a part of the hub, and a metallic hub 13 having a flange at one end and a roughened peripheral surface to insure good bonding with the non-metallic portions. The material forming the disks, rings and beveled washer is canvas or duck which has been first coated or treated with a binder such as a phenolic condensation product as bakelite, for example, but my invention is not limited to this particular binder.

Figure 8:
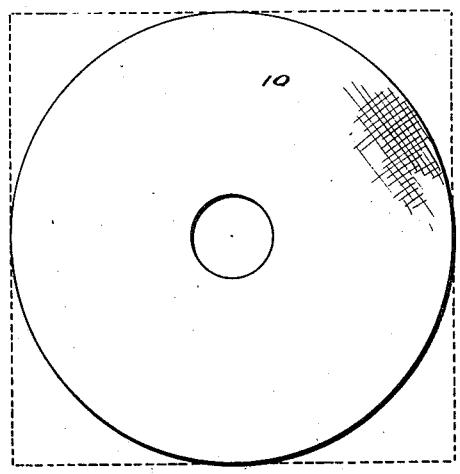

The disks 10 are cut from sheet material as shown in Fig. 8 by suitable dinking dies. The rim rings are preferably made in the manner shown in Fig. 5. That is to say, I take a sheet of woven fabric 14 and with dies cut therefrom segmental pieces 15. The radius of curvature of the peripheral and inner edges of each segment is the same, said radius being that of the finished gear, or a slightly larger one to make allowance for finishing where desirable. By using the same radius for the inner and outer edges of each segment it follows that the only waste in forming is that due to cutting the ends of the segments in radial planes and also to a small amount at the beginning and end of each sheet of textile material. As a result of this each segment is somewhat wider, measured radially, at the center 16 than at the ends 17, Fig. 6. To state the matter in another and somewhat broader way each segment tapers in width from the center toward both ends.

The arc covered by each segment may be varied to suit different conditions. For certain sizes of gears it will be found satisfactory to have each segment form about one-third of a complete circle. The next step is to assemble these segments into a complete ring as shown in Fig. 6. One suitable way to do this will now be described. One of the segments is placed in a cylindrical metal form or fixture 18 with its outer edge in contact with the inner wall of the form. On top of this is placed a second segment which however, instead of being in exact register therewith overlaps the same at one end to a certain extent. A third segment is then placed on top of the second with the same overlapping arrangement. This procedure is continued until a complete ring is formed. The ring may be composed of one or more complete turns or layers. For certain types of gears I find that a ring made of four layers is satisfactory but a greater or lesser number may be employed. After the ring is formed in this manner the parts are temporarily secured together. This may readily be done by subjecting the same to sufficient heat to soften the binder and to sufficient pressure to cause the segments to stick together. After this operation the ring may be freely handled in the subsequent assembly. No attempt is made at this stage to cure the binder.

Another way to form the rings is shown in Fig. 7. The segments are assembled on or around a cylindrical form or fixture until the desired thickness for the ring is obtained after which the segments are united by a limited number of thin metal staples 19 such as are commonly used to fasten papers together.

Another step in the process is to take the trimmings which are left after cutting the disks 10 from sheet stock and the segments 15 and chop them into relatively small pieces. The material thus formed which may be in the nature of small squares or oblong pieces is then placed in a mold to form a filler or washer for the hub of the gear. It is desirable that the amount of material be carefully weighed before being put into the mold so as to ensure the same amount in each case. Care should also be exercised to see that the compression pressure to which the gear blank is finally subjected is substantially uniform at every point. To state the matter another way the size of the completed filler or washer should be such as to completely fill the space allotted to it but no more or less. To attain the best results the washer should be thickest at its bore in which the metallic hub is located and be beveled outwardly to a rather thin edge, the purpose of the latter being to avoid any pockets in the interior of the blank.

The press for forming the washer may be of any suitable construction. As shown it comprises a cylindrical member 20 designed to rest upon a suitable platen 21 and is provided with handles 22 for convenience in handling. Inside said member is a second cylindrical member 23 having a pointed nose to facilitate the distribution of the small pieces of chopped up material as they are poured in. The two members are held in proper spaced relation by a ring 24 which has a beveled upper surface, the angle of said bevel being determined chiefly by the thickness and shape of the hub of the gear blank. Above the chopped material in the mold is a second ring 25 which is oppositely beveled and usually by the same amount as the lower ring. Above the upper ring is a tubular plunger or follower 26 by means of which the filling material is compressed. Fig. 3 shows the material before compression, and Fig. 4 after compression. Preferably, the material is heated sufficiently to soften the binder and the effect of the pressure is to cause the small pieces to stick together sufficiently so that the finished beveled ring or washer 12 as shown in Fig. 2 can be freely handled.

After the various parts are formed they are assembled in a mold or fixture about the metal hub 13, layer by layer, with the ring and disks interspersed and the beveled washer around the metal hub and midway of the opposite sides of the blank. The parts thus assembled are then subjected to heat and heavy pressure which has the effect of compressing the fibers of which the duck or canvas is composed and causing the binder to be cured or set and to retain the fibers in their compressed state. In those cases where the web is relatively thin with respect to rim and hub the two outside or finishing disks may be formed to their approximate shape before the final assembly. By this means all danger of breaking the fibers of which the disk is composed is eliminated.

After the blank has been properly cooled it is removed from the mold and the teeth 27 cut in the usual manner. Owing to the action of the compressing and forming mold the blank as it is taken therefrom has a smooth, glass-like finish over its entire surface. Before cutting the teeth the blank may be turned to the exact diameter required but this operation is not necessary in all cases. Preferably the teeth are spirally cut since this tends to decrease shock in operation. The fact that the web is thinner than the rim and hub permits of slight deflections of the rim with respect to the hub under shocks incident to the use of the gear. The use of a metal hub affords a simple effective means for securing the gear on its shaft. Since the disks extend from the hub to the periphery of the rim and are interspersed with the rings it follows that the latter are firmly united to the hub and are therefore well arranged to resist the strains to which the gear is subjected in service.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A gear blank of the character described, comprising disks and rim-forming rings both made of textile material, a hub member situated between certain of the disks and composed of small pieces of textile material shaped to predetermined form before assembly, and means for holding all of said textile material in a compressed state.

2. A gear blank of the character described, comprising disks and rim-forming rings, both formed of textile material, a hub member situated between certain of the disks and composed of pieces of textile material compressed to form a washer having a beveled surface, and means for holding all of said textile material in a compressed state.

3. A gear blank of the character described, comprising interspersed disks and rim-forming rings both formed of textile material, a hub member situated between certain of the disks and composed of small pieces of textile material which are compressed before assembly to form a washer which is beveled outwardly on both sides from its bore, and a binder for holding all of said textile material in a compressed state.

4. A hub member for a gear blank comprising small pieces of woven textile material which have been coated with a binder and are compressed to form a washer which is thickest at its bore and is beveled outwardly therefrom.

5. A gear blank of the character described, comprising disks and rings made of textile material, said rings being formed of overlapping segments, the inner and outer edges of which have the same radius of curvature, and means for retaining the said material in a compressed state.

6. A gear blank of the character described, comprising interspersed disks and rings made of textile material, said rings being formed of overlapping segments, the inner and outer edges of which have the same radius of curvature, and a binder for retaining the said material in a compressed state.

7. A gear blank of the character described, comprising interspersed disks and rings made of textile material, each of said rings being composed of two or more layers of overlapping segmental pieces, the inner and outer edges of each segment having the same radius of curvature, and a binder for retaining the said material in a compressed state.

8. A gear blank of the character described, comprising disks and rings made of textile material, said rings being formed of overlapping segmental pieces, each of which tapers in width toward one end, and a binder for retaining the said material in a compressed state.

9. A gear blank of the character described, comprising disks and rings made of textile material, said rings being formed of overlapping segmental pieces each of which tapers in width from the center toward both ends, and a binder for retaining the said material in a compressed state.

10. A rim member for a gear of the character described, comprising segmental pieces of textile material arranged in overlapping relation to form a ring, each of said segments tapering in width from the center toward both ends, said material being coated with a binder.

11. A rim member for a gear of the character described, comprising segmental pieces of textile material arranged in overlapping relation to form a ring, each of said segments having its inner and outer edges conforming to the same radius of curvature, said material being coated with a binder.

12. A gear blank of the character described comprising interspersed disks and rings made of woven textile material, said rings comprising overlapping segmental pieces each of which tapers from the center toward the ends a hub member situated between certain of the disks and composed of small pieces of textile material formed into a washer which decreases in thickness outwardly from the bore, and a binder for retaining all of said textile material in a compressed state.

13. A gear blank of the character described, comprising a metallic hub, interspersed disks and rings made of textile material which form the web and rim respectively, said rings being composed of segmental pieces the inner and outer edges of which have the same radius of curvature, and a filling piece which closely surrounds the metallic hub, is situated between certain of the disks and is composed of small pieces of textile material pressed into the form of a washer which is thickest at its bore and tapers outwardly, and a binder for holding all of said material in a compressed state.

14. The method of forming parts of the rim of a gear blank which comprises cutting segments from non-metallic sheet material in such manner that the cut which forms the inner edge of one segment also forms the outer edge of another segment, coating the segments with a binder, assembling the segments in overlapping relation into a ring, and temporarily uniting the segments.

15. The method of forming hub members for gear blanks which comprises cutting up woven textile material which has been treated with a binder into small pieces, molding the pieces into a washer which tapers outwardly from the center and subjecting the material to heat to soften the binder and to sufficient pressure to temporarily hold the pieces together.

In witness whereof, I have hereunto set my hand this 8th day of November 1923.

EMILE J. GUAY.